(12) United States Patent
Finding et al.

(10) Patent No.: US 10,685,489 B2
(45) Date of Patent: Jun. 16, 2020

(54) SYSTEM AND METHOD FOR AUTHORING AND SHARING CONTENT IN AUGMENTED REALITY

(71) Applicant: DAQRI, LLC, Los Angeles, CA (US)

(72) Inventors: Samuel Finding, Santa Monica, CA (US); Brian Mullins, Altadena, CA (US); Noopur Gupta, San Jose, CA (US); Anthony L. Reyes, San Jose, CA (US); Neil Aalto, Lahaina, HI (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/448,391

(22) Filed: Mar. 2, 2017

(65) Prior Publication Data

US 2018/0253900 A1 Sep. 6, 2018

(51) Int. Cl.
| | |
|---|---|
| *G06T 15/00* | (2011.01) |
| *G06T 19/00* | (2011.01) |
| *G02B 27/01* | (2006.01) |
| *G02B 27/00* | (2006.01) |

(52) U.S. Cl.
CPC ........ *G06T 19/006* (2013.01); *G02B 27/0093* (2013.01); *G02B 27/017* (2013.01); *G06T 19/003* (2013.01); *G02B 2027/014* (2013.01); *G02B 2027/0138* (2013.01); *G02B 2027/0141* (2013.01); *G02B 2027/0187* (2013.01)

(58) Field of Classification Search
CPC ....... G06T 19/006; G06T 19/00; G06T 11/60; G06F 3/012; G06F 3/011; G06F 3/04842; G02B 27/017; H04L 51/32; H04L 67/18; H04L 67/38

USPC ......................................................... 345/419
See application file for complete search history.

(56) References Cited

U.S. PATENT DOCUMENTS

| | | | |
|---|---|---|---|
| 9,361,729 B2 * | 6/2016 | Narayanan | G06T 19/006 |
| 9,898,870 B2 * | 2/2018 | Narayanan | G06T 19/006 |
| 9,922,226 B1 * | 3/2018 | Boyd | G06K 7/1456 |

(Continued)

OTHER PUBLICATIONS

Heartwood3d, Augmented Reality (AR) for Operations & Maintenance Training and Work Instructions, Oct. 26, 2015, 0:00-1:56, https://www.youtube.com/watch?v=Q2FP-PLZhIY.*

(Continued)

*Primary Examiner* — Phu K Nguyen
(74) *Attorney, Agent, or Firm* — Schwegman Lundberg & Woessner, P.A.

(57) ABSTRACT

A device has an optical sensor, an inertial sensor, and a hardware processor. The optical sensor generates image data. The inertial sensor generates inertia data. The hardware processor receives an augmented reality (AR) authoring template authored at a client device, generates media content using the image data, and receives a selection of spatial coordinates within a three-dimensional region using the inertia data and the image data. The three-dimensional region is identified in the AR authoring template. The hardware processor further identifies an entry in the AR authoring template corresponding to the media content, places the media content at the selected spatial coordinates in the entry in the AR authoring template, and forms AR content using the media content at the selected spatial coordinates placed in the entry in the AR authoring template.

20 Claims, 12 Drawing Sheets

(56) References Cited

U.S. PATENT DOCUMENTS 9,940,788 B2 * 4/2018 Lyons .................. G07F 17/3241
9,984,499 B1 * 5/2018 Jurgenson ............... G06T 17/00

OTHER PUBLICATIONS

EquipCodes, Augmented Reality Equipment Training & Maintenance App; Jan. 9, 2015; https://www.youtube.com/watch?v=nHfY56IHZjU.*

Epson Moverio, Augmented Reality Training Demonstration—by Scope AR using the Epson Moverio BT-100, https://www.youtube.com/watch?v=eVV5tUmky6c&feature=emb_logo, Feb. 7, 2013.*

ColumbiaCGUI, Augmented reality in the psychomotor phase of a procedural task, https://www.youtube.com/watch?v=2eSIMSJ65Kc&feature=emb_logo, Mar. 25, 2012.*

* cited by examiner ically relates to the processing of data. Specifically, the present disclosure addresses systems and methods for authoring and sharing augmented reality content using augmented reality display devices.

BACKGROUND

Augmented reality (AR) devices can be used to generate and display data in addition to an image captured with the AR devices. For example, AR provides a live, direct or indirect, view of a physical, real-world environment whose elements are augmented by computer-generated sensory input such as sound, video, graphics or GPS data. With the help of advanced AR technology (e.g. adding computer vision, object recognition, and other complementary technologies), the information about the surrounding real world of the user becomes interactive. Device-generated (e.g., artificial) information about the environment and its objects can be overlaid on the real world.

AR devices can be used to provide enhanced assistance (e.g., technical support) to other users via human interaction, and customized data generated for the specific time and issue where assistance is needed. However, complex authoring tools are used on a desktop computer to author AR content for the AR devices. The desktop tool may not be suitable to accurately position AR content in specific locations in the real world.

BRIEF DESCRIPTION OF THE DRAWINGS

Some embodiments are illustrated by way of example and not limitation in the figures of the accompanying drawings.

DETAILED DESCRIPTION

Figure 1:
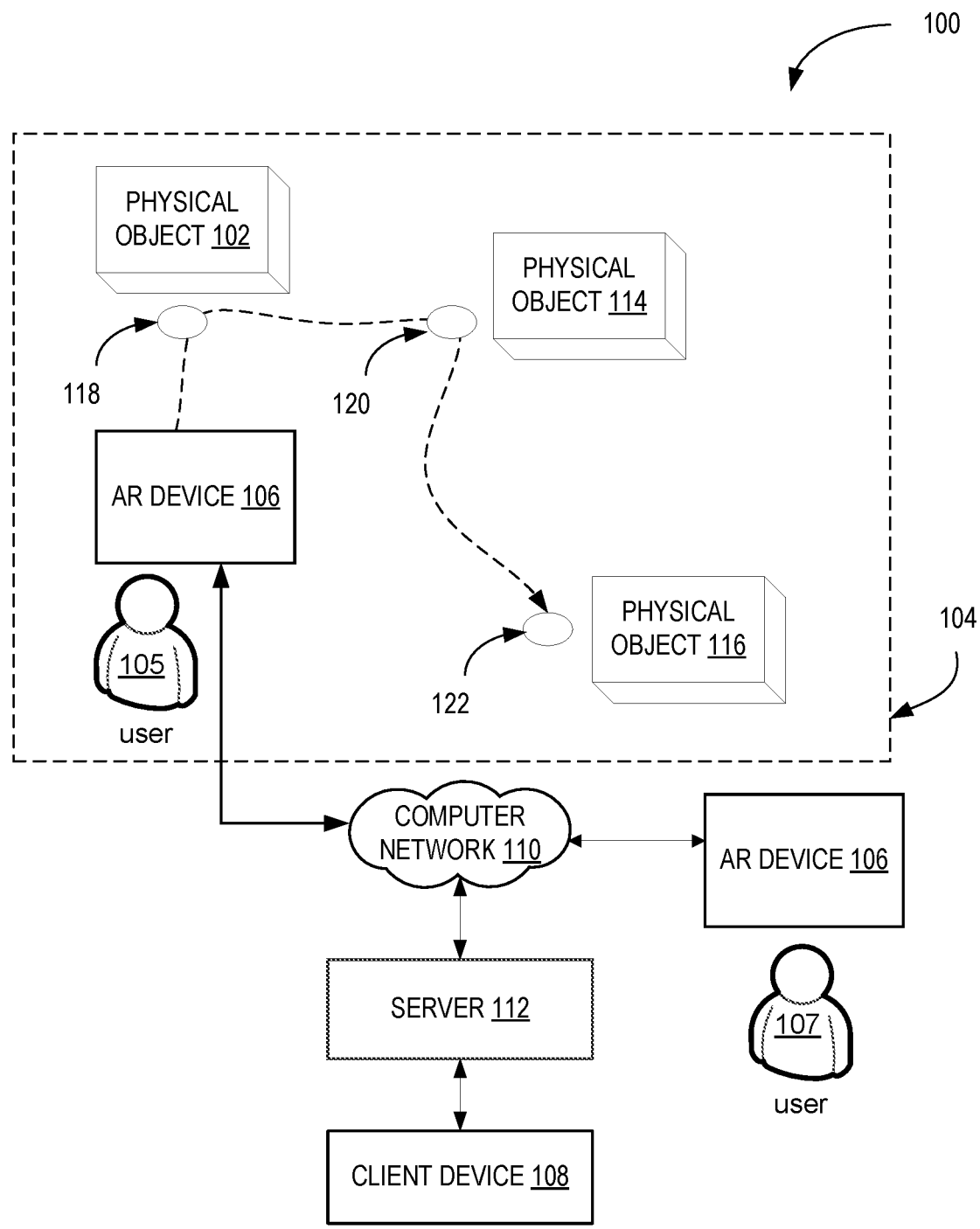
FIG. 1 is a block diagram illustrating an example embodiment of a network environment suitable for authoring augmented reality (AR) content.

Example methods and systems are directed to authoring and sharing augmented reality (AR) content using AR display devices. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR devices allow a user to experience information, such as in the form of a three-dimensional virtual object overlaid on an image of a physical object captured by a camera of a display device (e.g., mobile computing device, wearable computing device such as a head mounted device). The physical object may include a visual reference (e.g., an identifiable visual feature) that the augmented reality application can identify. A visualization of the additional information, such as the three-dimensional virtual object overlaid or engaged with an image of the physical object, is generated in a display of the AR device. The three-dimensional virtual object may selected based on the recognized visual reference, a captured image of the physical object, or a location, position, or orientation of the display device. A rendering of the visualization of the three-dimensional virtual object may be based on a position of the display relative to the visual reference. Other AR applications allow a user to experience visualization of the additional information overlaid on top of a view or an image of any object in the real physical world. The virtual object may include a three-dimensional virtual object or a two-dimensional virtual object. For example, the three-dimensional virtual object may include a three-dimensional view of a machine. The two-dimensional virtual object may include a two-dimensional view of a dialog box, a menu, or written information such as statistics information for a factory tool. An image of the virtual object may be rendered at the display device.

AR devices can also be used to provide instructions on how to operate machinery or tools in factory. Such instructions are typically available in the form of simple paper check lists or work flow diagram. For example, a factory worker consults a physical binder to retrieve information on how to operate a particular machine in a factory. AR devices can be used to provide instructions in the form of virtual content displayed over a real world object. For example, a user of an AR device walks up to a machine and sees an operating checking list that appears to float above a machine. In that scenario, the AR device recognizes the machine, retrieves the virtual content (e.g., operating instructions, checklist) associated with the machine, and displays the virtual content. The virtual content is displayed relative to the machine (e.g., on top of a button of the machine) and may not be based on three-dimensional (3D) real world coordinates in the real world. Authoring virtual content based on 3D real world coordinates may be time consuming and require a significant manual effort from an author of the virtual content. For example, the author uses a 3D editor and 3D information on a client device and manually determines the exact location in a 3D space where the virtual content would appear.

In other exemplary embodiments, AR devices may also be used to share one or more virtual content displays between a multiplicity of users. For example, a first user, using a first AR device, may travel in an area, such as, and without limitation, a corridor, a park, a building floor, an office, a road, or substantially any other open or closed space, while placing virtual content within the area. A second user, using a second AR device, may physically travel through the area and view the virtual content previously placed by the first user. In this example, the placed virtual content may be associated with a location within the area, wherein the second AR device of the second user recognizes location within the area and displays the virtual content associated with the location. In many embodiments a location may be for example, and without limitation, a location of a real world physical object, a position or orientation within an environmental space, an angle relative to a user of an AR device, or any combination thereof.

The present application describes a system, in accordance with an example embodiment, that enables a user to create an AR authoring template using, for example, a web editor on a client device. The user then operates the AR device to record content at locations within the real world, and to physically place the recorded content in the real world based on for example, and without limitation, three-dimensional real world coordinates, GPS coordinates, and/or determined coordinates relative to the AR device. Therefore, in many exemplary embodiments, the location of the placed content may not rely on the location or detection of a real world physical object. The placed content may include their own three-dimensional real world coordinates as measured and determined by the AR device. Once the content is placed in the AR authoring template, virtual content is generated and can be shared to other AR devices. The other AR devices can view the virtual content at their respectively placed locations and positions.

In one example, a plant operator may want to train employees to complete a 20-point daily inspection. The plant operator, using an AR device, may place inspection points throughout the plant to illustrate what the employees are to do. The plant operator can record steps of instructions at one or more locations which particular steps should be performed in the plant and then share the recorded steps of instructions as virtual content with the employees. The employees can use their own AR devices to view the recorded steps of instructions to potentially learn how to perform the same inspection.

In another example, a factory worker may install a new production line and may want to share shut down and/or start up information with other workers. The process may involve several instructions at different points along the line. With conventional techniques, this information is manually shared with a physical piece of paper and a description of each step. Some of the steps can be quite complicated and it is contemplated that it would be helpful to share the steps so they are contextually relevant in the plant. In other words, the relevant information may be displayed at a predefined location within the plant. In another example, an experienced boiler engineer may want to teach his less experienced team member how to service an old boiler because minimal documentation is currently available.

The present application describes an AR device than enables a user of the AR device to generate virtual content by recording a video of the user fixing a machine. For example, the video may show how to change a filter of a machine. Other virtual content may include, for example, and without limitation, video, images, thermal data, biometric data, user and application input, graphics, audio, annotations, AR manipulations, 3D objects, graphics animations, or substantially any other display render-able data.

The AR device generates sensor data that includes, for example, and without limitation, geographic location, inertia measurements, position and location of the AR device, user identification, expert identification, task identification, physical object identification, nearby machine identification, and the like. Virtual AR content may be triggered and displayed in the AR device based on playback parameters. In many embodiments, the playback parameters identify conditions under which the AR content is to be displayed. In some embodiments, the AR content may be triggered and retrieved when the user of the AR device is identified to be of a predetermined occupation, performing a predetermined task, at a particular location. For example, and without limitation, an electrical technician, repairing a transformer located at a particular location, may be using an AR device, wherein recognizable playback parameters, captured by the AR device, can identify the user's occupation, task, and location, to trigger an AR content display in the user's AR device. In many embodiments, the AR content may be triggered based on for example, and without limitation, substantially one or any combination of an identity of a user of an AR device (e.g. registered profile information, biometric data, a geographic location of a recognized object (e.g., a machine located on the first floor in building A, a statue located in a park), a geographic location of an AR device (e.g. GPS coordinates of the device, inertial measurement data of the device, calculated visual inertial measurement data of the device), a condition of an object (e.g., defective machine, non-responsive instrument, operational device, dead tree), the task to be performed (e.g., repair, scheduled maintenance, unscheduled maintenance, removal, observe), the level of experience of the user (e.g., apprentice).

For example, a video or an animation showing how to fix or repair a machine may be displayed in the AR device when an apprentice level user approaches a defective machine. The AR device displays AR content generated based on recorded content data and sensor data from an authoring user of the AR device. For example, conditions under which the previously recorded media content is displayed may be based on multiple methods, such as a time-based method (e.g., starts at t0 and plays for 10 seconds) and/or spatial-based method (the scene/data/information is displayed when a user is in position x-y-z). The content data and sensor data is sent to one or more servers that catalog and store the data.

In some exemplary embodiments, an AR device includes one or more optical sensors, one or more inertial sensors, and a hardware processor. The optical sensor generates image data. The inertial sensors generate inertia data. The hardware processor receives an augmented reality (AR) authoring template authored at a client device such as a client computer and/or one or more distinct AR devices, generates media content using the image data, and receives a selection of spatial coordinates within a three-dimensional region using the inertia data and the image data. The three-dimensional region is identified in the AR authoring template. The hardware processor further identifies an entry in the AR authoring template corresponding to the media content, places the media content at the selected spatial coordinates in the entry in the AR authoring template, and forms AR content using the media content at the selected spatial coordinates placed in the entry in the AR authoring template.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a network environment 100 suitable for authoring augmented reality (AR) content, according to some example embodiments. The network environment 100 includes one or more AR devices 106 such as, and without limitation, a head mounted display, wearable display devices, or a mobile phone. The network environment further includes, a client device 108, and a server 112, communicatively coupled to each other via a computer network 110. The AR devices 106, client device 108, and the server 112 may each be implemented in a computer system, in whole or in part, as described below with respect to FIG. 8. The server 112 may be part of a network-based system. For example, the network-based system may be or include a cloud-based server system that provides additional information, such as three-dimensional models, AR authoring templates, object recognition data, and additional AR content to the AR device 106 and the client device 108.

The client device 108 accesses a virtual content authoring website hosted by the server 112. For example, the client device 108 accesses and forms an AR authoring template using the virtual content authoring website. The AR authoring template includes, for example, a customized entry form geared towards a particular set of users (e.g., new hires), a particular location (e.g., first floor of a factory), or a particular task (e.g., daily inspection). In one example, the AR authoring template includes a form or a table identifying specific machines or tools, corresponding entries for media content to be recorded, corresponding entries for specific locations in space (e.g., three-dimensional coordinates), corresponding entries for work instructions or notes. In another example, the AR authoring template includes a flow diagram or check list. The AR authoring template is then provided to the AR device 106.

The AR device 106 may be worn or held by a multiplicity of users, a sampling denoted here as user 105 and user 107 (e.g., a construction worker and a manager). The users 105 and 107 are not part of the network environment 100, but are associated with the corresponding AR device 106. For example, the AR device 106 may be a wearable computing device with a display, such as a head-mounted computing device with a display and a camera. The display and camera may be disposed on separate devices but may be communicatively connected. The AR device 106 may also be hand held or may be temporarily mounted on a head of the user 105. In one example, the display may be a screen that displays what is captured with a camera of the AR device 106. In another example, the display of the AR device 106 may be at least transparent, such as lenses of computing glasses. In another example, the display may be non-transparent and wearable by the user 105 to cover the field of view of the user 105. In many embodiments AR device 106 may be separate and distinct devices of different types (e.g. a head mounted display and a mobile phone), wherein components and software modules of the separate and distinct devices are the same.

In many embodiments, the user 105 wears the AR device 106 and walks towards different objects (e.g., physical objects 102, 114, 116) to record and register different media content within a predefined region 104 (e.g., factory building). For example, the user 105 may walk up to location 118 in front of the physical object 102 and start recording a video showing how to operate the physical object 102 (e.g., a factory tool). The user 105 then places the recorded media content at a specific location in the 3D space (independent of the location 118 of the physical object 102). The user 105 then walks to location 120 in front of the physical object 114 and places another item of media content at another specific location in the 3D space. Similarly, the user 105 walks to the physical object 116 and places another item of media content or a note already provided in the AR authoring template at another specific location in the 3D space within the predefined region 104. Once the media content is placed at their respective locations, the AR device 106 generates AR content based on the media content filled in the AR authoring template with their respective playback parameters (e.g., 3D coordinates in the real world). The AR content is saved at the server 112 and can be shared with other AR devices located at the predefined region 104.

In some exemplary embodiments, the AR device 106 is used to display the published AR content to the user 105. For example, the user 105 may be located at the location 118. The AR device 106 determines a location 118, orientation, and position of the AR device 106 within the predefined region 104 using a combination of inertia data, wireless data from fixed frame of references, and image data. Media content associated with the location 118, orientation, and position of the AR device 106 is displayed at a specific location (e.g., 3D coordinates in space) as placed by the author of the media content. Therefore, the media content may be displayed independently from detecting the physical object 102.

In some embodiments, the user 105 points the AR device 106 at the physical object 102 and captures an image of the physical object 102. The image is tracked and recognized locally in the AR device 106 using a local database such as a context recognition dataset module of the augmented reality content application of the AR device 106. The local context recognition dataset module may include a library of virtual objects associated with real-world physical object 102 or references. The augmented reality content application then generates additional information corresponding to the image (e.g., a three-dimensional model) and presents this additional information in a display of the AR device 106 in response to identifying the recognized image. If the captured image is not recognized locally at the AR device 106, the AR device 106 downloads additional information (e.g., the three-dimensional model) corresponding to the captured image from a database at the server 112 over the computer network 110.

In accordance with another embodiment, the server 112 receives media content from the AR device 106 and generates annotations (e.g., audio/video comments) on the media content. Each audio/video comment is associated with a particular location in space. The server 112 stores the audio/video comments and spatial location for the corresponding portions of the media content. In another example, the client device 108 generates media content (e.g., a video, an animation, audio content) related the virtual object associated with the physical object 102.

The server 112 may also receive AR content data, user profile data, and sensor data from the AR device 106. The server 112 may generate playback content based on the AR content data, user profile data, and sensor data. The playback content may include, for example, and without limitation, video feed from the AR device 106, annotated video feed, original content (e.g., audio/video content, text) from the client device 108, media content, 3D models, and changes to the 3D models. The server 112 also computes playback parameters for the playback content. The playback parameters may be based on the sensor data from the AR device 106. The playback parameters include, for example, and without limitation, a geographic location (e.g., the location 118), an identification of the type of physical object 102 (e.g., a specific type of machine), a task related to the physical object 102 (e.g., replacing a component of a machine, performing an inspection), and an identity of the user 105 (e.g., entry-level technician). For example, the playback content associated with a particular task related to the physical object 102 is triggered when an AR device 106 is detected at the location 118 or is within a predefined distance or range (e.g., a few feet) of the physical object 102.

In some example embodiments, the AR device 106 may offload some processes (e.g., tracking and rendering of virtual objects to be displayed in the AR device 106) using the tracking sensors and computing resources of the server 112. The tracking sensors may be used to track the location and orientation of the AR device 106 externally without having to rely on the sensors internal to the AR device 106. The tracking sensors may be used additively or as a failsafe/redundancy or for fine tuning. The tracking sensors may include optical sensors (e.g., depth-enabled 3D IR cameras), wireless sensors (e.g., Bluetooth, WiFi), GPS sensors, biometric sensors, and audio sensors to determine the location of the user 105 with the AR device 106, distances between the user 105 and the tracking sensors in the physical environment (e.g., sensors placed in corners of a venue or a room), or the orientation of the AR device 106 to track what the user 105 is looking at (e.g., direction at which the AR device 106 is pointed).

In many embodiments, the computing resources of the server 112 may be used to determine and render virtual content based on the tracking data (generated internally with the AR device 106 or externally with the tracking sensors). An AR rendering is therefore performed on the server 112 and streamed back to the AR device 106. Thus, the AR device 106 does not have to compute and render any virtual object and may display the already rendered virtual object in a display of the AR device 106.

In another embodiment, data from the tracking sensors may be used for analytics data processing at the server 112 for analysis of how the user 105 is interacting with the physical environment. For example, the analytics data may track at what locations 118, 120, 122 (e.g., points or features) on the physical object 102 or virtual object the user 105 has looked, how long the user 105 has looked at each location 118, 120, 122 on the physical object 102 or virtual object, how the user 105 held the AR device 106 when looking at the physical object 102 or virtual object, which features of the virtual object the user 105 interacted with (e.g., whether a user 105 tapped on a link in the virtual object), and any suitable combination thereof. For example, the client device 108 receives a visualization content dataset related to the analytics data.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The computer network 110 may be any network that enables communication between or among machines (e.g., the server 112), databases, and devices 106, 108. Accordingly, the computer network 110 may be a wired network, a wireless network (e.g., a mobile or cellular network), or any suitable combination thereof. The computer network 110 may include one or more portions that constitute a private network, a public network (e.g., the Internet), or any suitable combination thereof.

Figure 2:
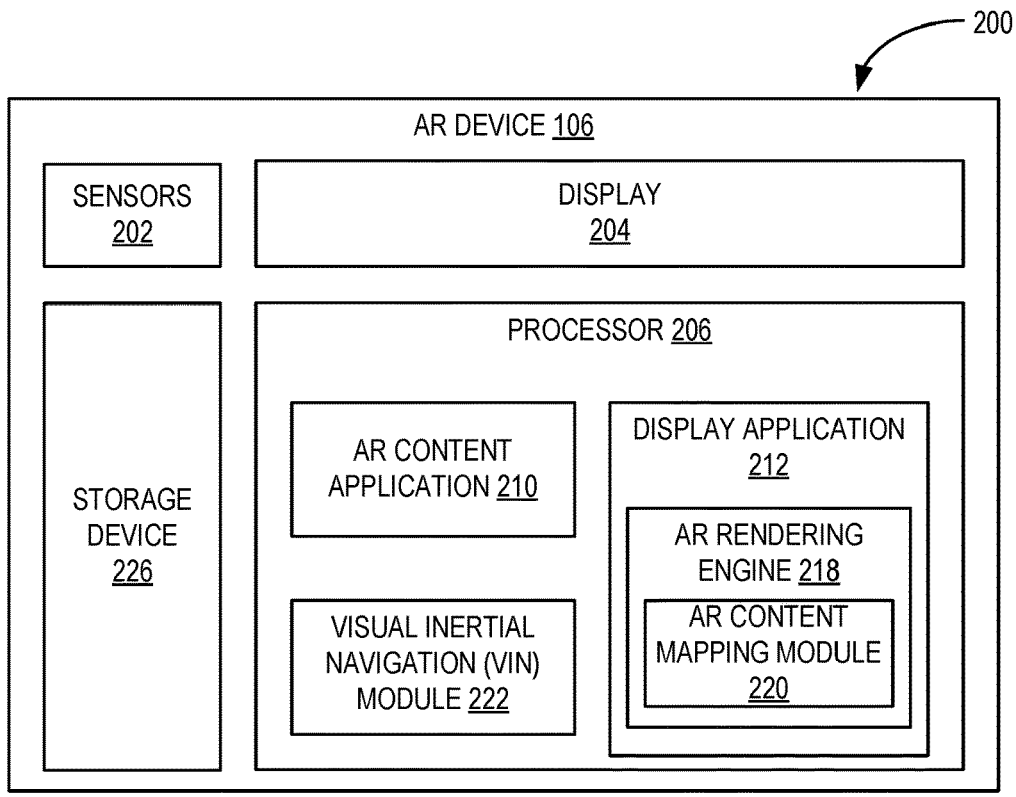
FIG. 2 is a block diagram illustrating an example embodiment of modules (e.g., components) of an AR device.

FIG. 2 is a block diagram 200 illustrating modules (e.g., components) of an exemplary embodiment of an AR device 106, in accordance with some embodiments. The AR device 106 may include sensors 202, a display 204, a processor 206, and a storage device 208.

The sensors 202 may include, for example, and without limitation. a proximity or location sensor (e.g., near field communication, GPS, Bluetooth, Wi-Fi), an optical sensor (e.g., a camera), an orientation or inertia sensor (e.g., a gyroscope, accelerometer, inertial measurement unit (IMU)), an audio sensor (e.g., a microphone), depth sensors, such as, infrared (IR) camera and IR projector, thermal sensor or any suitable combination thereof. It is noted that the sensors 202 described herein are for illustration purposes only and the sensors 202 are thus not limited to the ones described. The sensors 202 may be configured to capture for example, and without limitation, video and audio of a user 105 of the AR device 106. In many embodiments, the sensors may also be further configured to capture geo-spatial coordinate position data of the AR device, inertial movement data (e.g. acceleration, pitch, yaw, roll, and changes thereof) of the AR device, and depth data, such as range information via projecting and receiving IR lasers reflected from objects and surfaces surrounding the AR device.

The display 204 may include, for example, and without limitation, a transparent display configured to display images or content generated by the processor 206. In another example embodiment, the display 204 includes a touch-screen display configured to receive user input via a contact on the touchscreen display. In some alternative embodiments, the display may include a non-transparent display. In yet another alternative embodiment, the display may include a dynamic display which may transition between states of transparency and non-transparency by applying a voltage to the display.

The processor 206 may include an AR content application 210, a display application 212, and a visual inertial navigation (VIN) module 220. In many embodiments, in accordance with the present invention, the AR content application 210 may form records of content and display the content in display 204, wherein the displayed content includes a display position and orientation associated with a 3D coordinate location in the real world based on captured sensor data from the AR device. In some embodiments, content application 210 records media content and displays the media content in display 204, wherein the displayed media content is based on an AR authoring template. For example, the AR content application 210 records a video of a user 105 of the AR device 106 showing how to operate and/or manipulate a physical object 102. Furthermore, the AR content application 210 is also configured to trigger the display of previously displayed content, wherein the previously displayed content is initially selected by a first user of a first AR device and the display triggering occurs with respect to a second user of a second AR device. For example, an AR content application of a first AR device registers displayed content, such as, and without limitation, a first user displaying a 3D model and manipulations of the model over a time duration t, to a real world location. Moreover, an AR content application of a second AR device may be triggered, at a same real world location, to display the 3D model and manipulations over the time duration t, to a second user, wherein the first and second AR devices may be distinct devices. The AR content application 210 is described in more detail below with respect to FIG. 3.

The display application 212 generates virtual content for display in the display 204. In one example embodiment, the display application 212 may include an AR rendering engine 218. The AR rendering engine 218 may render virtual content such as, and without limitation, three-dimensional models (e.g., virtual object), media content (e.g. videos, pictures, audio, social media content, instructions, 2D images and scenes), manipulations/changes of three dimensional models (e.g. a virtual object with registered alteration states), graphics, previously displayed virtual content, or substantially any combination thereof. In some exemplary embodiments, the AR rendering engine 218 retrieves a three-dimensional model of a virtual object in relation to a reference object that may be different from the physical object 102. For example, the reference object may be associated with the physical object 102 and may include a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object (e.g., an image that has been previously determined to correspond to the three-dimensional virtual object).

The AR rendering engine 218 may further include an AR content mapping module 220. The AR content mapping module 220 maps the location of the AR content to be displayed in the display 106 based on a calculated dynamic state and/or inertial sensor data captured by the AR device 106. As such, the AR content may be accurately displayed based on a relative position of the AR device 106 in space, based on a relative position of the AR device 106 in a physical environment, and/or based on an orientation of the viewing device. When the user moves, the inertial position of the AR device 106 is tracked and the display of the AR content is adjusted based on the new inertial position. For example, the user may view a virtual object visually perceived to be on a physical table. The position, location, and display of the virtual object is updated in the display 106 as the user moves around the physical table (e.g., away from, closer to, around).

The visual inertial navigation (VIN) module 222 enables a wearer or user to view the virtual object layers on a view of a real world environment. An absolute position or relative position of the AR device in space may be tracked using the visual inertial navigation (VIN) module in the AR device. In some embodiments, the VIN module generates a plurality of video frames with at least one camera of the AR device and generates inertial measurement unit (IMU) data with at least one IMU sensor of the AR device. The VIN module tracks features in the plurality of video frames for each camera, synchronizes and aligns the plurality of video frames for each camera with the IMU data. The VIN module then computes a dynamic state of the AR device based on the synchronized plurality of video frames with the IMU data. The computed dynamic state is utilized by the AR content mapping module to position virtual content in the display of the AR device. Although not shown, in some embodiments, the VIN module 222 may reside on a remote server (e.g., server 112) and communicate with AR devices via the computer network 110.

The VIN module 222 computes a dynamic state of the AR device 106 by determining the position and orientation of the AR device 106. In one embodiment, given N wearable devices (1 or more cameras on each wearable device) over time, M stationary points tracked over time, and gyroscope and accelerometer data over time, the VIN module 222 solves for the position and orientation of the AR devices. The stationary points may be used as constraints with the inertial information to compute the position and orientation of the wearable devices.

The VIN module 222 accesses the following data so as to compute the position and orientation of the AR device 106 in space over time:

Stationary world points $(x_i, y_i, z_i)$ where i represents the $i^{th}$ world point,
Gyroscope measurements $(g_{xt}, g_{yt}, g_{zt})$,
Accelerometer measurements $(a_{xt}, a_{yt}, a_{zt})$,
Gyroscope bias $(bg_{xt}, bg_{yt}, bg_{zt})$ and
Accelerometer bias $(ba_{xt}, ba_{yt}, ba_{zt})$ where t is time.

The VIN module 222 may generate a 3D map that consists of an (x,y,z) for each stationary point in the real physical world being tracked.

In some example embodiments, an AR device may consist of one or more image capture devices (e.g., camera) mounted on a rigid platform with one or more Inertial Navigation Unit (IMU) sensors. The image capture devices may be mounted with non-overlapping (distributed aperture) or overlapping (stereo or more) fields-of-view.

In some example embodiments, the VIN module 222 includes an algorithm that combines inertial information from the inertial sensor(s) and one or more image capture device(s) in close proximity and coupled to a rigid platform or a rig. In one embodiment, a rig may consist of multiple cameras mounted on a rigid platform with an inertial navigation unit. A rig may thus have at least one inertial navigation unit and at least one camera.

The storage device 226 stores a database of references (e.g., images, AR device 3D coordinate locations, time durations, AR device relative locations, AR device orientations, user identification data) and corresponding content (e.g., audio/video recording, three-dimensional virtual objects, interactive features of the three-dimensional virtual objects, changing states of virtual objects, recordings of manipulations of virtual objects, virtual models of user actions). For example, the reference may include a machine-readable code, a previously identified image (e.g., a picture of machine), a location 118, 120, 122 of the AR device 106. The previously identified image of the machine may correspond to a three-dimensional virtual model of the machine that can be viewed from different angles by manipulating the position of the AR device 106 relative to the picture of the machine. Features of the three-dimensional virtual machine may include selectable icons on the three-dimensional virtual model of the machine. An icon may be selected or activated by tapping or moving on the client device 108. In one example embodiment, the storage device 226 may store a three-dimensional model of the physical object 102. In another example embodiment, a reference may include a playable virtual model, wherein the model depicts a previous user's action (e.g. ghost image). For example, a first user of a first AR device may travel a path, while location and time information is recorded by the AR device throughout the path. A second user may use a second AR device which may be triggered at an initial location that corresponds to an initial location of the first user's travel path. The second AR device may display a virtual model, via the AR rendering engine, of a figure walking through the traveled path, wherein the display of the virtual model corresponds to the first user's travel velocity, position, and orientation. In many exemplary embodiments, a recording of one or more positions and/or one or more identified objects may trigger the rendering engine of an AR device to display, for example, and without limitation, virtual objects which include state changes over a duration of time, a user interacting with the virtual objects, audio recordings, media content, recorded images, or substantially any combination thereof. In many embodiments, the database of references and corresponding content may also be stored on server 112, wherein an identified reference may be communicated to server 112 from an AR device, and corresponding content may be communicated back to the AR device for display.

In another example embodiment, the storage device 226 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of the most popular images determined by the server 112. For example, the core set of images may include images depicting the ten machines with most problems and their corresponding experiences (e.g., virtual objects/media content associated with the ten machines). In another example, the server 112 generates the core set of images based on the most popular or often scanned images received by the server 112. Thus, the primary content dataset does not depend on objects or images scanned by the sensors 202 of the AR device 106.

The contextual content dataset includes, for example, a second set of images and corresponding experiences (e.g., three-dimensional virtual object models) retrieved from the server 112. For example, images captured with the AR device 106 that are not recognized in the primary content dataset are submitted to the server 112 for recognition. If the captured image is recognized by the server 112, a corresponding dataset may be downloaded by the AR device 106 and stored in the contextual content dataset. Thus, the contextual content dataset relies on the context in which AR device 106 has been used. As such, the contextual content dataset depends on objects or images scanned by the AR rendering engine 218.

Figure 3:
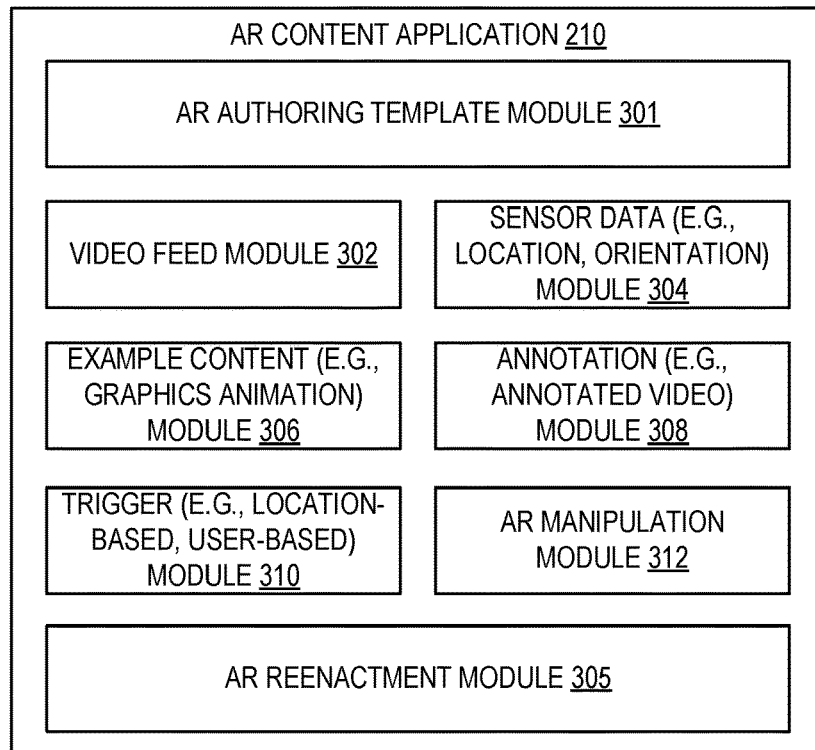
FIG. 3 is a block diagram illustrating an example embodiment of modules (e.g., components) of an AR content application.

FIG. 3 is a block diagram 300 illustrating an example embodiment of modules (e.g., components) of the AR content application 210. The AR content application 210 includes, for example, an AR authoring template module 301, a video feed module 302, a sensor data module 304, an example content module 306, an annotation module 308, a trigger module 310, an AR manipulation module 312, and an AR reenactment module 305.

The AR authoring template module 301 accesses an AR authoring template generated at the client device 108. As previously described, the AR authoring template includes, for example, a customized entry form geared towards a particular set of users 105 (e.g., new hires), a particular location 118, 120, 122 (e.g., first floor of a factory), or a particular task (e.g., daily inspection). In one example, the AR authoring template includes a form or a table identifying specific machines or tools, corresponding entries for media content to be recorded, corresponding entries of specific locations 118, 120, 122 in space (e.g., three-dimensional coordinates), corresponding entries for work instructions or notes. In another example, the AR authoring template includes a flow diagram or check list.

The video feed module 302 generates a video feed at the AR device 106 and may transmit video data to other modules of the AR device, the client device 108, server 112, and/or other AR devices. For example, and without limitation, a user 105 at the client device 108 can view a live video from the AR device 106. In another example, the video feed module 302 retrieves previously stored video data from the server 112.

The sensor data module 304 records sensor data from the sensors 202 of the AR device 106. Examples of sensor data include geographic location, absolute position data based on VIN computations, orientation data, inertia measurements, and biometric data of the user 105 of the AR device 106, and an identity of the user 105.

The example content module 306 records graphics animation or video generated at the AR device 106. For example, the graphics animation may be based on the user 105 manipulating a virtual object or a physical object similar to (e.g., same shape, size, model, color, and the like) or associated with the physical object 102. For example, the example content module 306 records a video of the user 105 showing how the user 105 repairs the physical object 102. In some embodiments, the example content module may generate ghost models as graphics animations, wherein a ghost model may be a template 3D model representative of a user or a real world object. In the present embodiment, the example content model may animate the ghost model based on a user's movements and orientation changes computed via an AR device of the user. Furthermore, the example content model may animate the ghost model based predetermined state transitions of the ghost model.

The annotation module 308 may generate annotations for a video feed and/or for displayed content as exemplified above, from the AR device 106. For example, the user 105 of the AR device 106 may narrate instructions while watching the video feed from the client device 108. The user 105 may further provide visual annotations on the video feed from the client device 108 with visual indicators such as virtual arrows. The visual indicators may be inserted using different user interface means (e.g., audio, tactile, gestures, touch interface). The visual annotations are associated with the video feed and placed at a 3D coordinate location. In some embodiments, after a first user of a first AR device associates content to a location, a second user using a second AR device may provide visual annotations to the associated content at the location.

The trigger module 310 may generate and compare playback parameters to determine when a trigger event has occurred. In many embodiments, newly determined playback parameters matching previously generated and stored playback parameters may indicate the trigger event, wherein an AR device, via the trigger module, may trigger a playback of a recording (e.g., media content, animation, annotated video) and/or one or more previously registered display(s). In many embodiments, playback parameters may include, for example, and without limitation, identified/recognized image data, locations of a real world physical objects, positions of an AR device within an environmental space, an angle relative to a user of an AR device, an angle relative to a viewing direction of an AR device, a selection of user information, or substantially any combination thereof. In some embodiments, a trigger event may be determined based on an exact matching of playback parameters or a proximity matching of playback parameters. For example, the trigger module 310 forms the playback parameters based on the sensor data (e.g., geographic location 118, 120, 122, orientation data, type of machine, task to be performed, user identification) from the other AR devices.

The AR manipulation module 312 records the user 105 manipulating a virtual object at a specific location. For example, the user 105 may interact and move components of the virtual object to demonstrate steps on how to repair the physical object 102 associated with the virtual object. The AR device 106 detects the user's interaction with the virtual object using sensors 202. For example, the AR device detects that the user 105 is pointing, or grasping a particular component or part of the virtual object. Other examples of AR manipulations include visual gestures (e.g., the user 105 is waving in a particular direction or moving his/her hands/fingers in a predefined pattern, or using a user interface to point to a particular location in space). The combination of the optical sensor, depth sensor, and inertia sensor are used to determine the 3D coordinates corresponding to the gesture location in space. In many embodiments, the virtual object and AR manipulations may be registered to a location at which a user performed the manipulations and a user profile of the user performing the manipulations.

The AR reenactment module 305 generates user experiences and shares the experiences to other users of AR devices and/or client devices. In many embodiments, the AR reenactment module 305 generates experiences by associating user identification information with generated example content, recorded annotations, and/or recorded AR manipulations, and one or more trigger events. For example, an identified first user of a first AR device may generate and register one or more example content, recorded annotations, and/or recorded AR manipulations at one or more particular locations or based on an identified real world object. The AR reenactment module 305 compiles the one or more example content, recorded annotations, and/or recorded AR manipulations as an experience associated with the first user, wherein the one or more particular locations and/or real world objects are determined to be playback parameters. A second user of a second AR device may trigger the display of the first user's experience on the second AR device by being positioned at the one or more particular locations and/or identifying the real world objects. The AR reenactment module 305 may generate a virtual timeline in which user experiences are triggered or played back in the same order in which the AR content was recorded.

Figure 4:
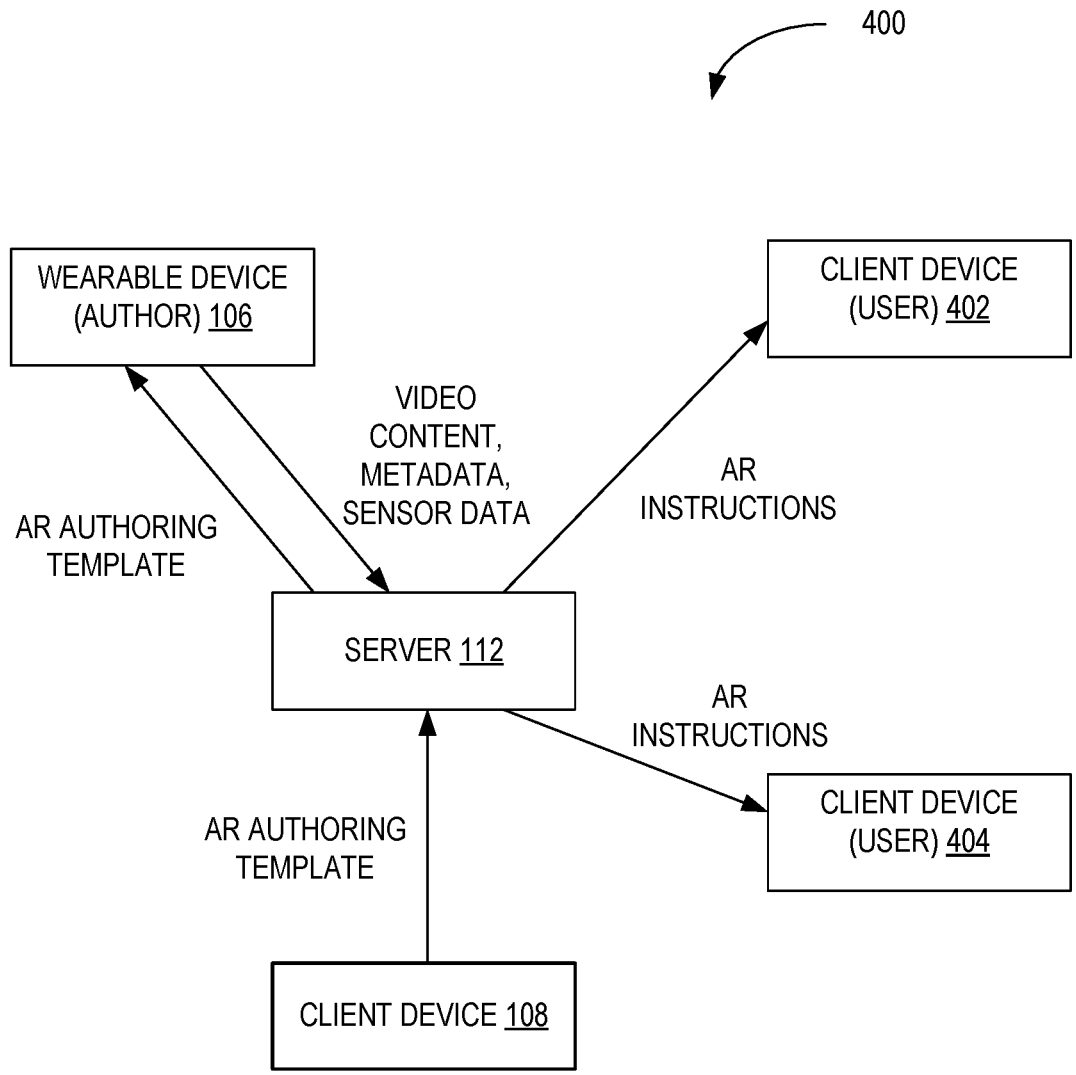
FIG. 4 is a block diagram illustrating an example of operation of AR content authoring and sharing.

FIG. 4 is a block diagram 400 illustrating an example of AR content authoring and sharing, according to some example embodiments of the present invention. The client device 108 provides the AR authoring template to the server 112. The server 112 provides the AR authoring template to the AR device 106 of an author (e.g., virtual content author). The AR device 106 records the author operating a physical object 102 and the registration of the media content at a particular location in space using 3D coordinates (that are independent of the location 118, 120, 122 of the physical object 102 or an image of the physical object). The author places the media content in an entry of the AR authoring template corresponding to the physical object 102. The AR device 106 generates AR content including the media content. In another example embodiment, the AR device 106 provides video content, metadata, sensor data to the server 112 which then generates AR content based on the video content, metadata, and sensor data. The AR content (e.g., AR instructions) are then published to other client devices 402, 404 (e.g., AR devices).

Figure 5:
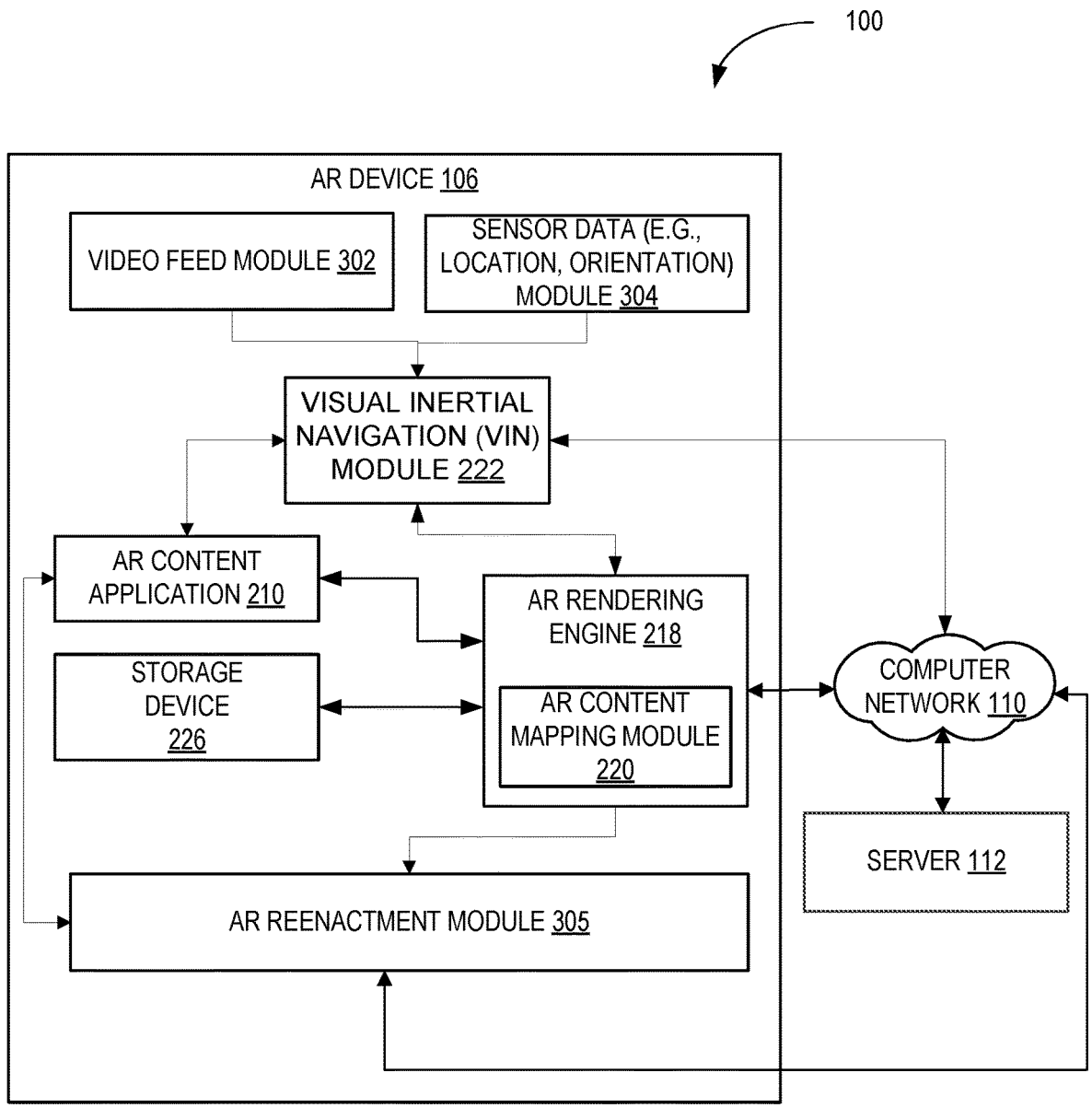
FIG. 5 is a software module diagram illustrating an example embodiment of experience generating and sharing.

FIG. 5 illustrates an exemplary software module diagram 500 of experience generating and sharing. In the present embodiment, and with reference to FIG. 2 and FIG. 3, a first user using a first AR device 106 may travel though an area while creating an experience. Video feed module 302 and sensor data module 304, of the first AR device, may generate and record environmental image data and AR device sensor data as the first user moves through the environment. The image data and sensor data may be provided to VIN module 222 wherein, the VIN module utilizes the sensor data and image data to determine a dynamic state of the first AR device. The first user may display virtual content by accessing storage device 226 of the AR device, AR content application 210, and/or remote server 112 to select virtual content to be rendered at a first location based on the dynamic state. The dynamic state and the selected content may be communicated to AR rendering engine 218 wherein, AR content mapping module may display the selected virtual content in display 204 based on the dynamic state. The dynamic state and selected virtual content may also be communicated to AR reenactment module 305, wherein the virtual content, location information, orientation information, and user profile information may be registered to generate an experience. The AR reenactment module 305 communicates experiences to server 112, wherein the experiences may be shared with a second user using a second AR device 106. The second user using the second AR device may travel through a same area as the first user to experience the registered virtual content selected by the first user. Video feed module 302 and sensor data module 304, of the second AR device, may generate and record environmental image data and AR device sensor data as the second user moves through the environment. The image data and sensor data may be provided to VIN module 222, of the second AR device, wherein, the VIN module utilizes the sensor data and image data to determine a dynamic state of the second AR device. The VIN module may also communicate image data, location data, and dynamic state data to AR content application 210 of the second AR device, wherein a trigger event may be determined. In a case that a triggering event is determined, playback parameters are communicated to server 112 to provide at least a portion of an experience, previously generated by the first AR device, to the second AR device for rendering and display. In many embodiments, an experience may be provided to a user in a piecewise manner, wherein different virtual content, of an experience, are registered to different playback parameters respectively. For example, and without limitation, an experience generated by a first user may include a first virtual content registered to a first location, a second virtual content registered to a second location, and a third virtual content registered to a third location, wherein each location is separate and distinct. A second user may only be provided with the first virtual content when the first location is detected by the second user's AR device, the second virtual content may be provided when the second location is detected by the second user's AR device, and the third virtual content may be provided when the third location is detected by the second user's AR device. In many embodiments, a multiplicity of users, using a multiplicity of distinct AR devices may be provided with generated experiences in response to determined trigger events by each AR device independently. In many embodiments, a first user may select a multiplicity of virtual content types at one or more locations which may be registered to generate an experience.

Figure 6:
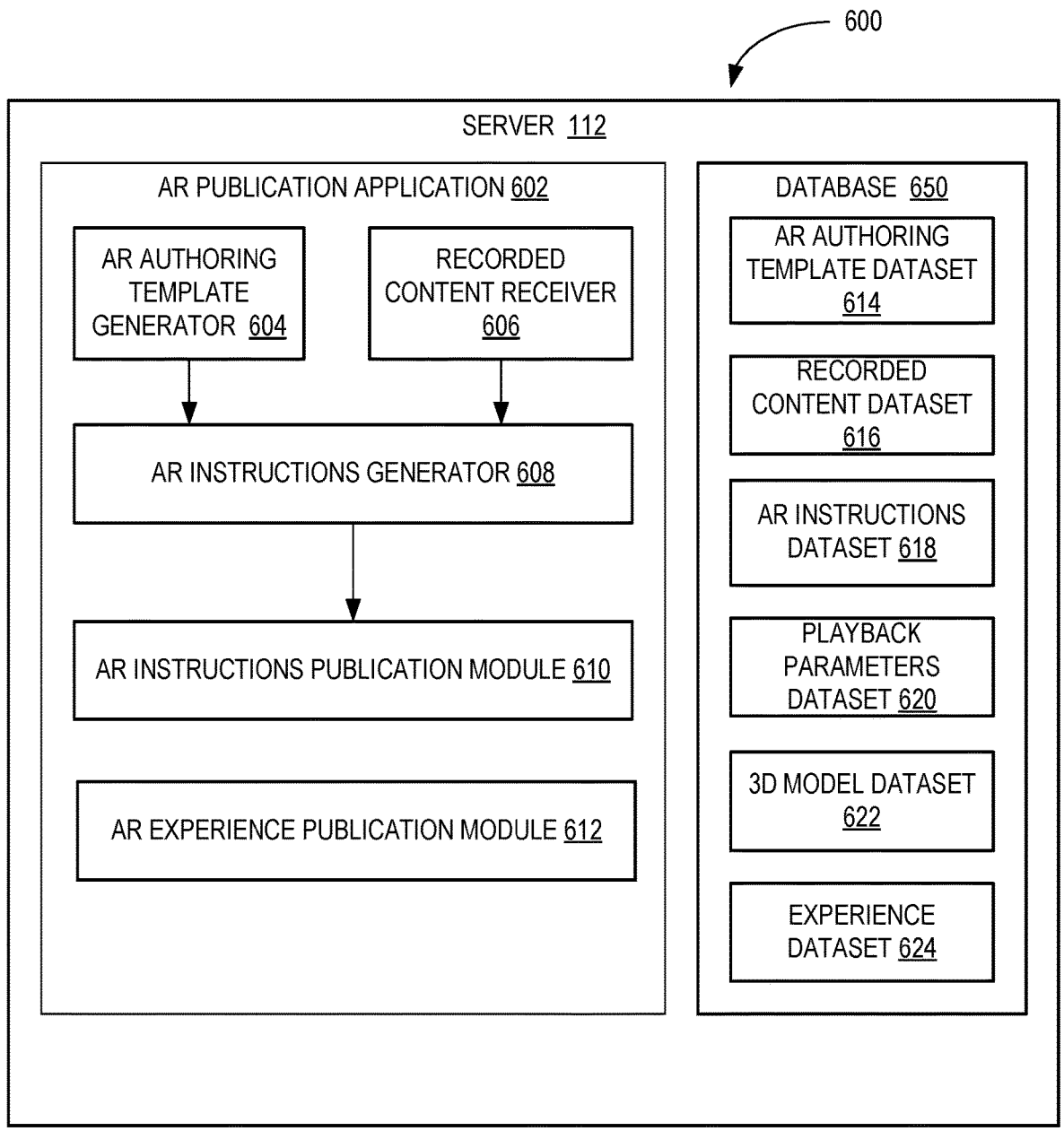
FIG. 6 is a block diagram illustrating modules (e.g. components) of an example embodiment of a server.

FIG. 6 is a block diagram 600 illustrating modules (e.g., components) of the server 112 in accordance with some embodiments of the present invention. The server 112 communicates with the AR devices 106 and the client device 108 to form and generate AR authoring template records, generated experiences, receive content (e.g., recordings at specific 3D locations 118, 120, 122) for the AR authoring template, and playback parameters associated with generated experiences. The server 112 includes an AR publication application 602 and a database 650. The AR publication application 602 includes an AR authoring template generator 604, a recorded content receiver 606, an AR instructions generator 608, and an AR instructions publication module 610, and an AR experience publication module 612.

The AR authoring template generator 604 generates AR authoring templates. For example, the AR authoring template may be formed based on a flow diagram or entries provided by a user 105 via a webpage. In one example, the AR authoring template includes a form or table for virtual content entries and corresponding 3D locations 118, 120, 122. The recorded content receiver 606 receives content (e.g., media content and location data) from the AR device 160.

The AR instructions generator 608 generates AR content based on the content provided in the AR authoring template. For example, AR content includes a virtual object or media content to be displayed at a particular 3D location identified by the user 105 of the AR device 106.

The AR instructions publication module 610 publishes and shares the AR content to other AR devices within the same predefined region 104.

The AR experience publication module 612 publishes and shares experiences communicated to server 112 from an AR device to other AR devices based on associated playback parameters.

The database 650 stores an AR authoring template dataset 614, a recorded content dataset 616, an AR instructions dataset 618, a playback parameters dataset 620, a 3D model dataset 622, and an experience dataset 624. The AR authoring template dataset 614 stores AR authoring templates. An example of an AR authoring template identifies the type of content (e.g., video, text notes, audio, 3D model), a location/orientation (e.g., in front and facing a specific machine), playback parameter triggers (e.g., video or virtual content is triggered for playback when the user performs a certain task, or when the user walks towards the specific machine).

The recorded content dataset 616 includes, for example, media content, audio recording, recorded images of virtual objects, notes, and corresponding 3D coordinates.

The AR instructions dataset 618 includes virtual instruction content, media content, corresponding 3D coordinates in the corresponding entries of the AR authoring template.

The playback parameters dataset 620 stores playback parameters associated with the AR instructions and/or AR content. For example, the playback parameters may identify a video content portion associated with a combination of a task, a machine identification, a user identification, and a location 118, 120, 122.

The 3D model dataset 622 includes for example, and without limitation, references (e.g., unique pattern or machine-vision enabled references) related to the physical object 102, pre-created three-dimensional virtual objects, interactive features of the three-dimensional virtual objects, state changes of virtual objects, recordings of manipulations of virtual objects, and virtual models of user actions (e.g. ghost models). For example, the 3D model dataset 622 includes a 3D model of the completed physical object 102 and other objects related to the physical object 102 such as, and without limitation, intermediate transitions of physical object 102, correct configurations of physical object 102, incorrect configurations of physical object 102 and operating states physical object 102. For example, the reference 3D model dataset 622 may include a 3D model of a machine.

The experience dataset 624 stores experiences, associated display locations, and user profile data generated by AR devices 106.

Figure 7A:
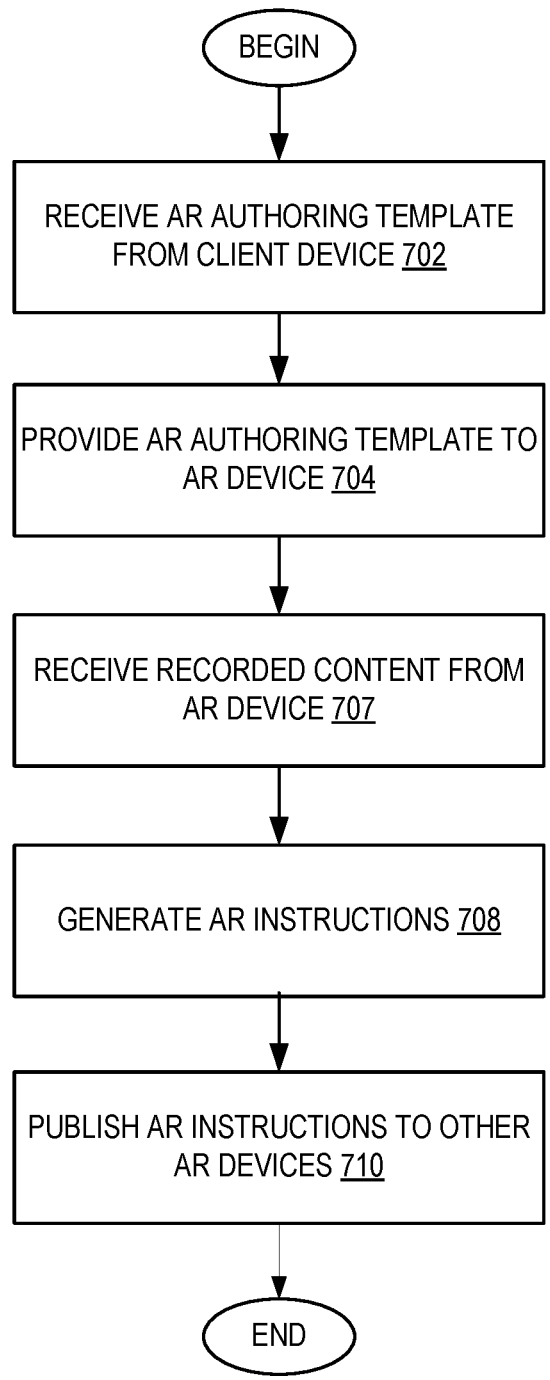
FIG. 7A is a flowchart illustrating an example embodiment of a method for generating and publishing AR instructions at a server.

FIG. 7A is a flowchart illustrating an example embodiment of a method for generating and publishing AR instructions at a server 112. The server 112 receives an AR authoring template from the client device 108 at operation 602. At operation 604, the server 112 provides the AR authoring template to the AR device 106. At operation 606, the server 112 receives recorded content (and corresponding 3D coordinates) from the AR device 106. At operation 608, the server 112 generates AR instructions based on the recorded content and the corresponding 3D coordinates. At operation 610, the server 112 publishes and shares the AR instructions to other AR devices (located in the predefined region 104).

Figure 7B:
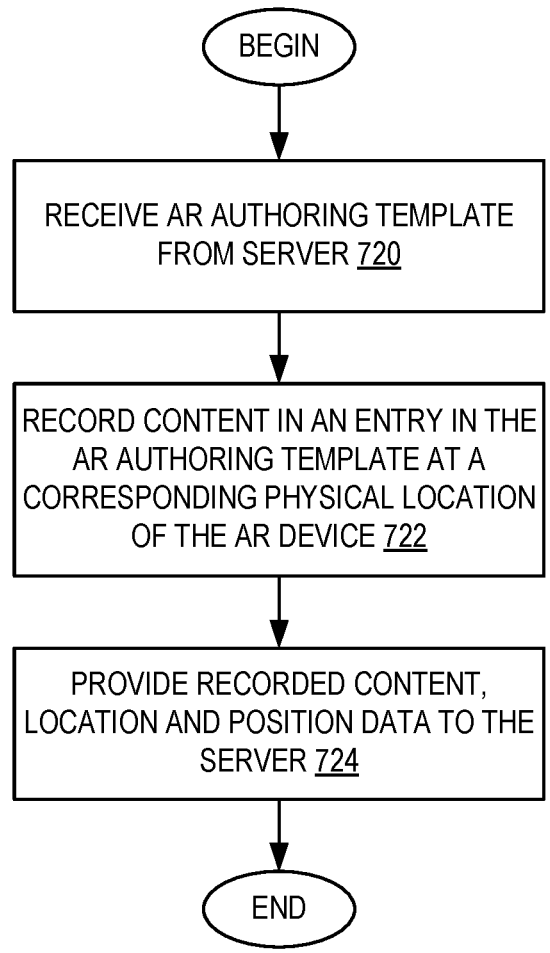
FIG. 7B is a flowchart illustrating an example embodiment of a method for generating AR instructions at an AR device.

FIG. 7B is a flowchart illustrating an example embodiment of a method for generating AR instructions at a AR device 106. At operation 720, the AR device 106 receives an AR authoring template from the server 112. At operation 722, the AR device 106 records content in an entry in the AR authoring template at a corresponding 3D physical location 118, 120, 122 as indicated by a user 105 of the AR device 106 (e.g., via a user interface, gesture, a pointer). At operation 724, the server 112 provides AR content (recorded content, location 118, 120, 122, position data) to the server 112.

Figure 7C:
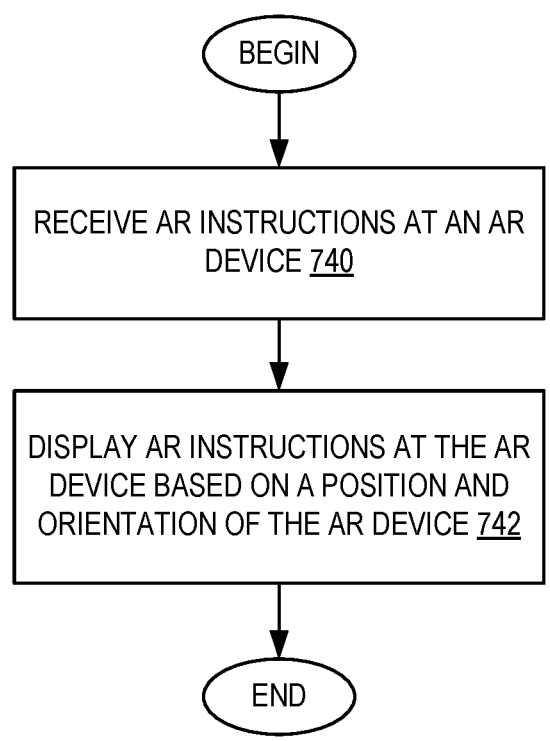
FIG. 7C is a flowchart illustrating an example embodiment of a method for displaying AR instructions at an AR device.

FIG. 7C is a flowchart illustrating an example embodiment of a method for displaying AR instructions at a AR device 106. At operation 740, an AR device 106 receives AR instructions from the server 112. At operation 742, the AR device 106 displays AR instructions based on the position, orientation, location 118, 120, 122 of the AR device 106.

Figure 8:
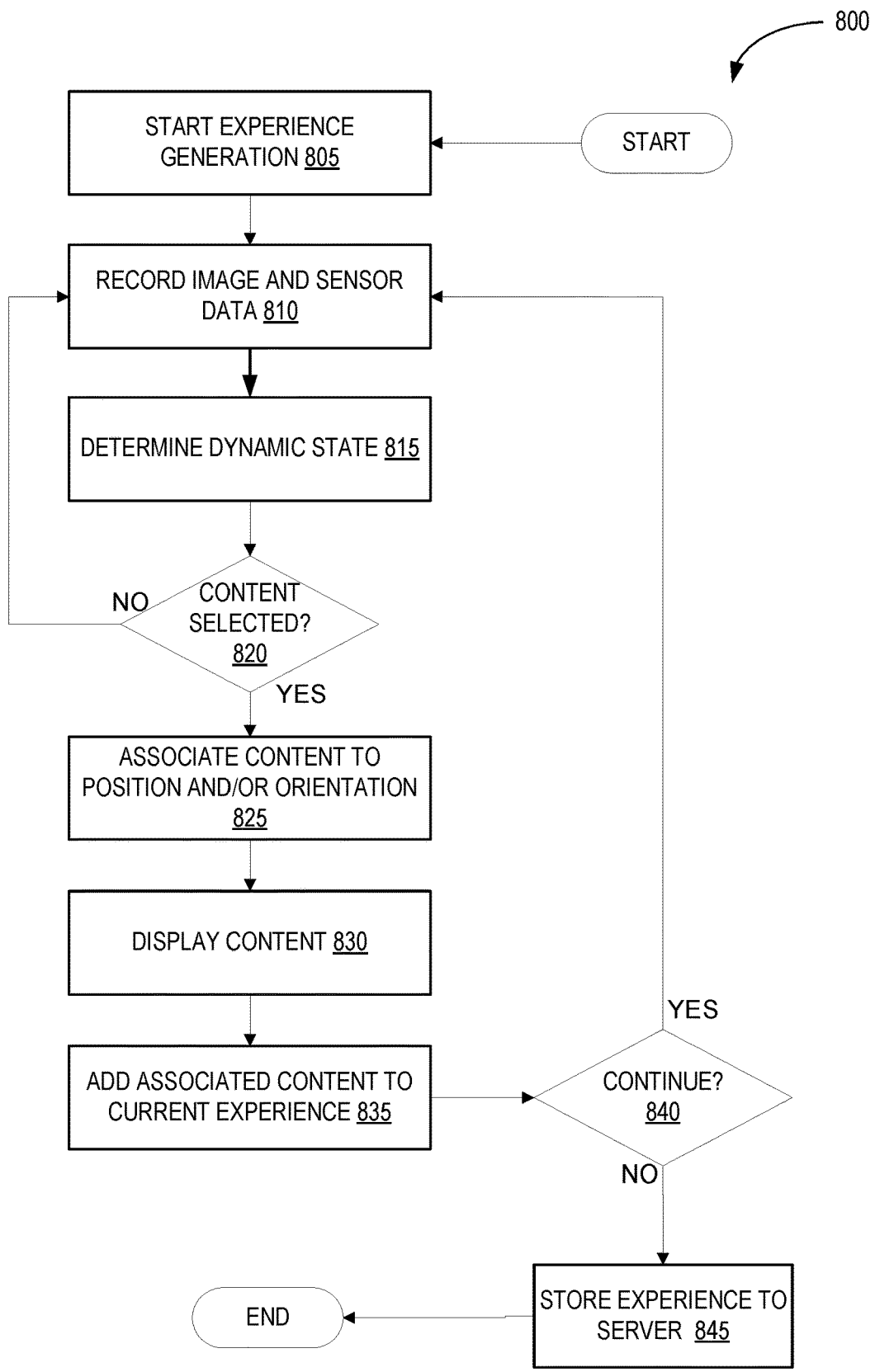
FIG. 8 is a flowchart illustrating an example embodiment of a method for generating an AR experience.

FIG. 8 illustrates an exemplary flowchart 800 of generating an AR experience in accordance with an embodiment of the present invention. In the present embodiment a user using an AR device 106 may travel through a real world environment and generate a sharable AR experience. The user may start generating the experience by initiating an experience generation application via a GUI of the AR device in an operation 805. As the user moves through the environment, the AR device records image data and sensor data, including at least images in a viewing direction and inertial movement data in an operation 810. In an operation 815, the AR device uses the image data and sensor data to determine a dynamic state of the AR device, wherein the dynamic state includes at least an absolute position and orientation of the AR device. In a decision operation 820, the user decides to select content to be displayed. In a case that no content is selected, the AR device continues to capture image data and sensor data to continuously update the dynamic state. In a case the content is selected, the position and orientation data is associated with the selected content in an operation 825. The content may then be displayed in a display device of AR device 106, in an operation 830. A mapping module of the AR device utilizes the position and orientation data to render the virtual content in the display device, wherein the virtual content may be associated with a real world position. In many embodiments, the virtual content may be associated with an orientation of the AR device such as a view angle. For example, a first virtual content may be displayed in the display device such that as the user moves around the environment, the mapping module re-renders the virtual content so that the virtual content is static with respect to a real world location and therefore dynamic within the display device and having a dynamic perspective rending (e.g. shrinking, growing, rotating in the display device as the user move away, closer and around). Furthermore, a second virtual content may be displayed in the display device such that as the user moves around the environment, the mapping module renders the virtual content at a user defined angle so that the virtual content is dynamic with respect to a real world location and therefore static within the display device and having a static perspective rendering (e.g. following the user). In an operation 835, an AR reenactment module of the AR device records the virtual content, type of display (e.g. dynamic perspective and/or static perspective), manipulations to the virtual content, the dynamic states during the display, and user identification information to generate an experience file. In a decision operation 840, the user decides to continue generating the experience. In a case that the user decides to continue generation the experience, the method returns to operation 810. In a case the user decides to end the experience generation, the experience is uploaded to a server 112 in an operation 845 and the method is ended.

Figure 9:
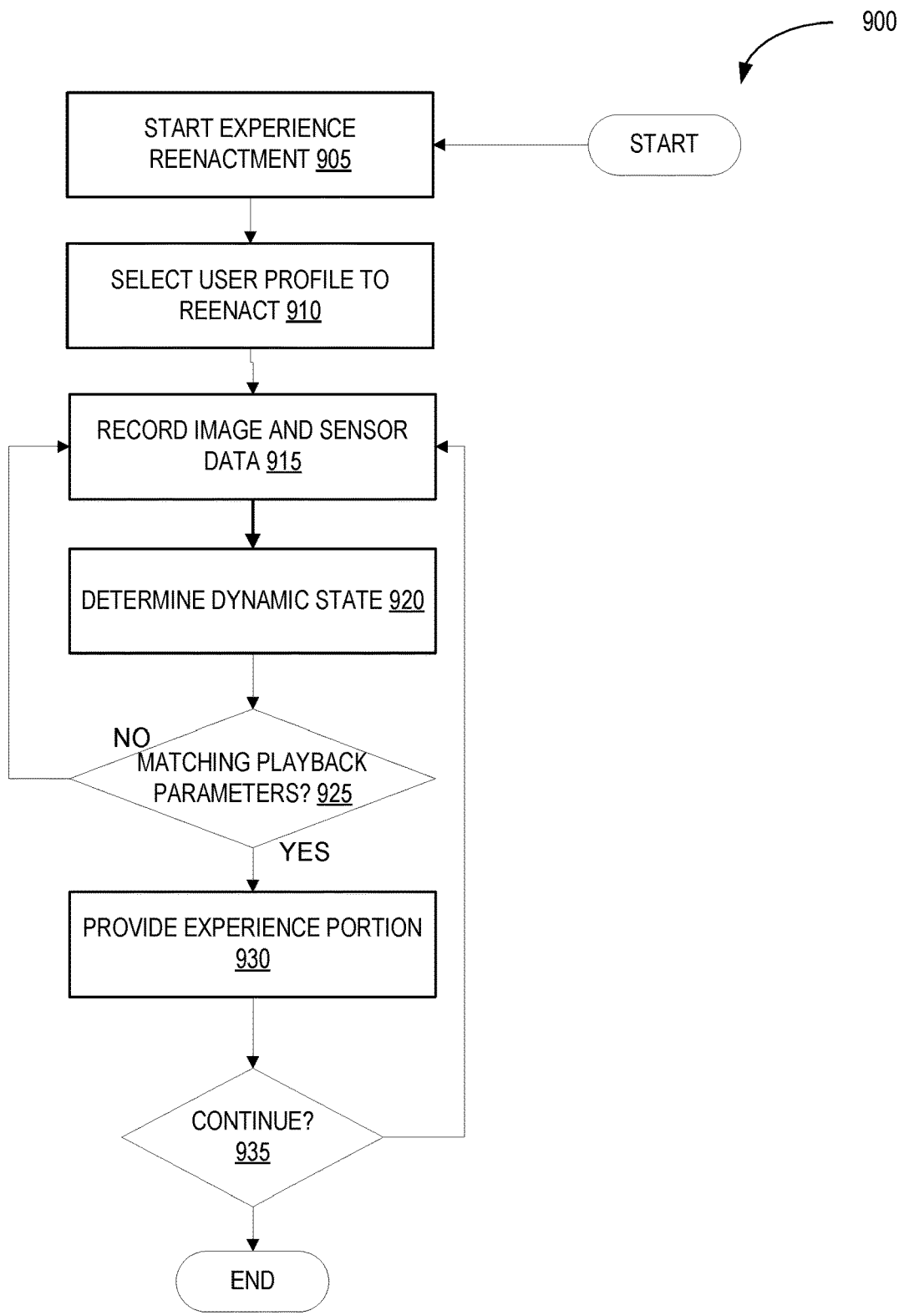
FIG. 9 flowchart illustrating an example embodiment of a method for reenacting an AR experience.

FIG. 9 illustrates an exemplary flowchart 900 of reenacting an AR experience in accordance with an embodiment of the present invention. In the present embodiment a user using a distinct AR device 106 may travel through a same real world environment as traveled by a previous user and experience the AR experience generated by the previous user. The user may start reenacting the generated experience by initiating an experience reenacting application via a GUI of the AR device in an operation 905. The distinct AR device then records user submitted profile information of the previous user associated with the generated experience in an operation 910. As the user moves through the environment, the AR device records image data and sensor data, including at least images in a viewing direction and inertial movement data in an operation 915. In an operation 920, the AR device uses the image data and sensor data to determine a dynamic state of the AR device, wherein the dynamic state includes at least an absolute position and orientation of the AR device. An AR reenactment module of the AR device may communicate the profile data, position data, inertial data, and/or image data to a server 112, wherein the communicated data may be used as playback parameters to identify an associated experience (e.g. virtual content) to display at the AR device. In a decision operation 925, an AR experience publication module of server 112, compares current playback parameters to previously registered playback parameters to determine user defined matching parameters. In a case that playback parameters do not match as prescribed, the method continues to record position and image data. In a case that the playback parameters do match as prescribed, the AR experience publication identifies one or more experience portions associated with the playback parameters and provides the one or more experience portions to the distinct AR device for display in an operation 930. In a decision operation 935, the user may decide to continue the experience reenacting. In a case that the user decides to continue, the method returns to operation 915 to continue gathering image data and sensor data. In a case that the user decides not to continue, the method is ended. In many embodiments, a user may also resubmit user profile data. In some embodiments, a user of an AR device may be automatically notified of possible other user associated experiences when the user is in a proximity to a playback parameter location and/or real world object as established via image data.

Figure 10:
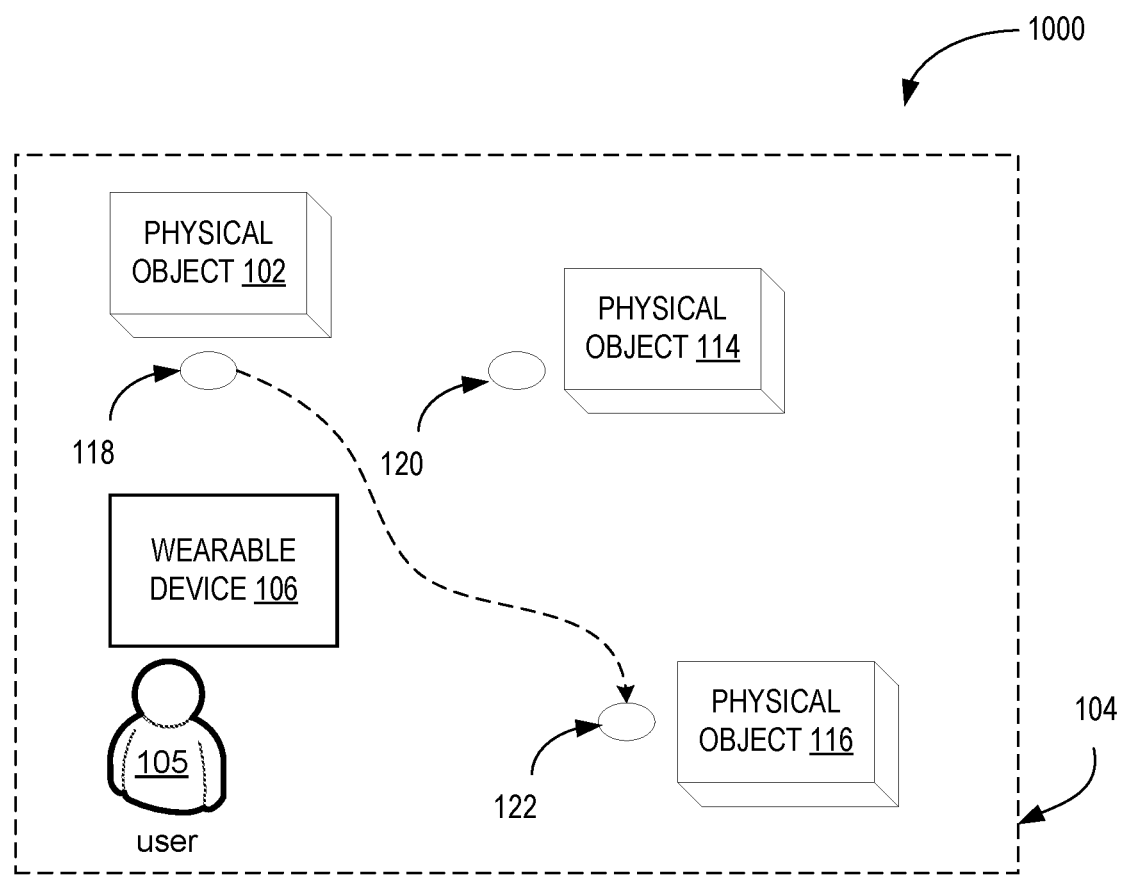
FIG. 10 is a block diagram illustrating another example embodiment of an operation of a network environment.

FIG. 10 is a block diagram 1000 illustrating another example operation of the network 110 of FIG. 1, according to some example embodiments. In another example embodiment, the present disclosure provides augmented contextual location aware system in an indoor space to guide a user 105 to a next step in their task in an indoor space. For example, the user 105 is about to perform a second task at physical object 102. The AR device 106 determines that a first task has not been performed at the physical object 116 and that the first task is required to be performed before the second task at the physical object 102. The AR device 106 notifies the user 105 of the first task and guides the user 105 to the physical object 116. For example, the AR device 106 provides directions to the user 105 to the physical object 116. The AR device 106 can display virtual arrows (or context-dependent visual information) to direct the user 105 to the physical object 116. Once the user 105 is located at the physical object 116, the AR device 106 generates instructions or virtual content illustrating how to perform the first task at the physical object 116.

In another example, the AR device 106 determines tasks to be performed by the user 105 at the physical object 116. The AR device 106 accesses the server 112 to determine whether any of the tasks for user 105 depend on the completion of other tasks or statuses at other physical objects. For example, changing an air filter of a machine should not be performed unless a valve at another location 118, 120, 122 is turned off. The AR device 106 generates a warning to the user 105 and guides the user 105 to shut off the valve prior to providing instructions on how to change the air filter. In another example, the AR device 106 generates virtual content to show how to turn off the valve at the other location 118, 120, 122. Furthermore, the AR device 106 detects the steps or actions performed by the user 105 at each station (or physical object 102, 114, 116) using sensors 202 from the AR device 106 and/or sensors 202 from each station (or physical object 102, 114, 116). The AR device 106 determines whether a step or action is missing based on the data from each wearable device or station.

In one example embodiment, a network is formed from the AR devices, physical objects 102, 114, 116, and the server 112. The server 112 receives data from the AR devices and the physical objects 102, 114, 116 and determines whether a step is missing from the task being performed by the users 105 of the AR devices. For example, a step at station A to be performed by user B is missing and required before a step at station C is performed by user D.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client device 108, or server 112 computer system) or one or more hardware modules of a computer system may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location 118, 120, 122 (e.g., within a home environment, an office environment, or a server farm), while in other embodiments the processors may be distributed across a number of locations 118, 120, 122.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 110 and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

A computing system can include the AR device 106, the client device 108, and the server 112. The AR device 106, the client device 108, and the server 112 are generally remote from each other and typically interact through a communication network. The relationship of AR device 106, the client device 108, and the server 112 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
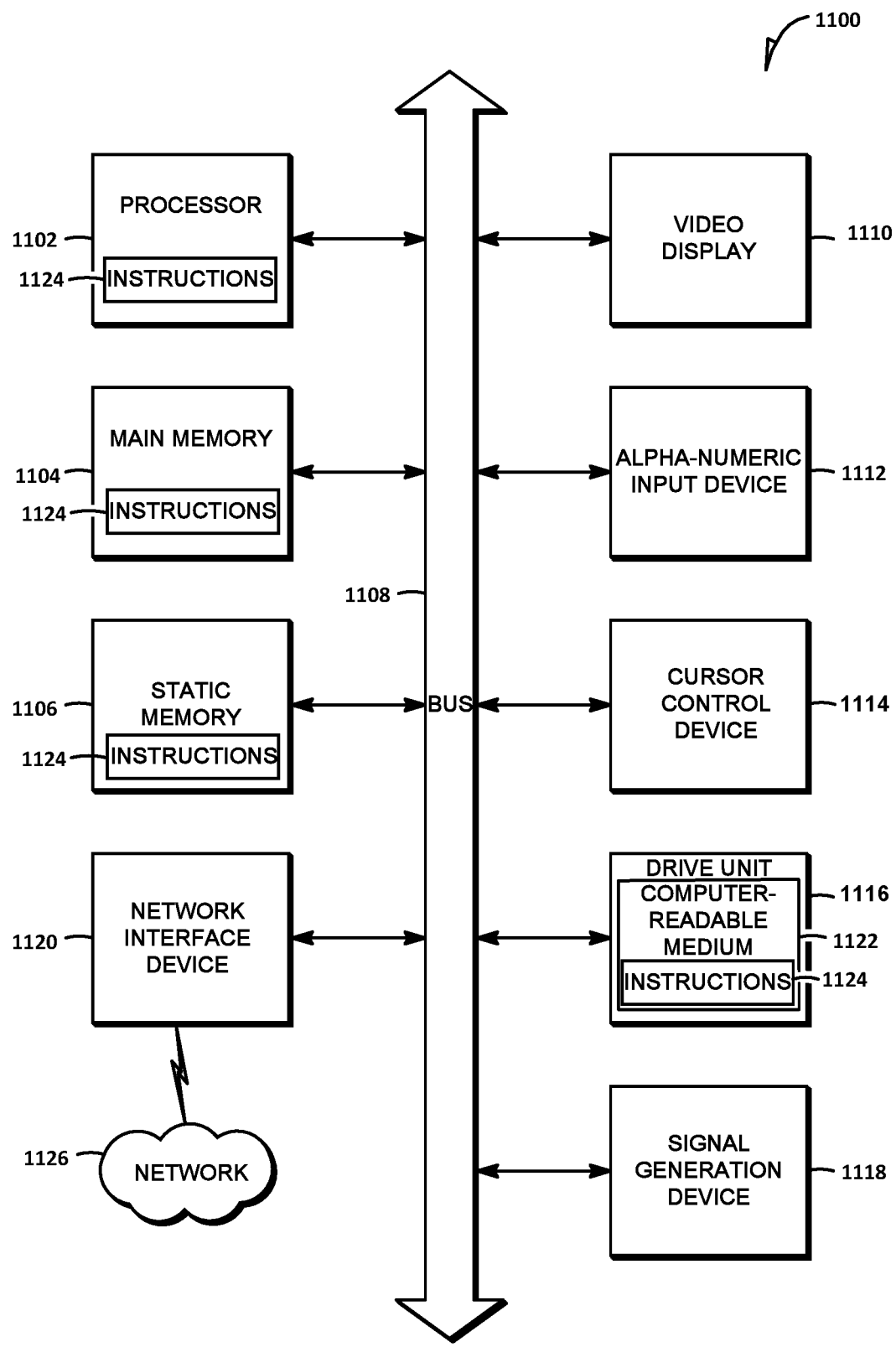
FIG. 11 is a block diagram illustrating exemplary components of a machine to perform any one or more of the methodologies discussed herein in accordance in accordance with one embodiment of the present disclosure.

FIG. 11 is a block diagram of a machine in the example form of a computer system 1100 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server 112 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display 1110 (e.g., a liquid crystal display (LCD) or a cathode ray tube (CRT)). The computer system 1100 also includes an alphanumeric input device 1112 (e.g., a keyboard), a user interface (UI) navigation (or cursor control) device 1114 (e.g., a mouse), a drive unit 1116, a signal generation device 1118 (e.g., a speaker) and a network interface device 1120.

Machine-Readable Medium

The drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media 1122. The instructions 1124 may also reside, completely or at least partially, within the static memory 1106.

While the machine-readable medium 1122 is shown in an example embodiment to be a single medium, the term "machine-readable medium" may include a single medium or multiple media (e.g., a centralized or distributed database, and/or associated caches and servers 112) that store the one or more instructions 1124 or data structures. The term "machine-readable medium" shall also be taken to include any tangible medium that is capable of storing, encoding or carrying instructions 1124 for execution by the machine and that cause the machine to perform any one or more of the methodologies of the present embodiments, or that is capable of storing, encoding or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disk read-only memory (CD-ROM) and digital versatile disk (or digital video disk) read-only memory (DVD-ROM) disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The following embodiments describe various example embodiments of methods, machine-readable media 1122, and systems (e.g., machines, devices, or other apparatus) discussed herein.

In a first exemplary embodiment, an AR device 106 comprising:
an optical sensor configured to generate image data;
an inertial sensor configured to generate inertia data;
one or more hardware processors 1102; and
a memory storing instructions 1124 that, when executed by the one or more hardware processors 1102, configure the AR device 106 to perform operations comprising:
receiving an augmented reality (AR) authoring template authored at a client device 108;
generating media content using the image data;
receiving a selection of spatial coordinates within a three-dimensional region using the inertia data and the image data, the three-dimensional region identified in the AR authoring template;
identifying an entry in the AR authoring template corresponding to the media content;
placing the media content at the selected spatial coordinates in the entry in the AR authoring template; and
forming an AR content using the media content at the selected spatial coordinates placed in the entry in the AR authoring template.

A second example provides the AR device 106 according to the first embodiment, wherein the AR authoring template includes a flow process of instructions 1124 for operating one or more physical objects 102, 114, 116 within the three-dimensional region.

A third example provides the AR device 106 of the first embodiment, wherein the media content includes a video recording generated at a geographic location 118, 120, 122 corresponding to the selected spatial coordinates within the three-dimensional region.

A fourth example provides the AR device 106 of the third embodiment, wherein the video recording includes a video of an operation of a physical object 102, 114, 116 by a user 105 of the AR device 106, the physical 102, 114, 116 object being located at the geographic location 118, 120, 122.

A fifth example provides the AR device 106 of the first embodiment, wherein receiving the selection of spatial coordinates further comprises:
determining a geographic location 118, 120, 122 of the AR device 106 using a combination of the image data and the inertia data;
determining a spatial location 118, 120, 122 identified by a user 105 of the AR device 106 via a user interface of the AR device 106;
defining the selected spatial coordinates to identify the spatial location 118, 120, 122; and
associating the AR content with the spatial location 118, 120, 122.

A sixth example provides the AR device 106 of the first embodiment, wherein the selected spatial coordinates are defined relative to a location 118, 120, 122 of a physical object 102, 114, 116 at the geographic location 118, 120, 122 of the AR device 106.

A seventh example provides the AR device 106 of the fifth embodiment, wherein the selected spatial coordinates are defined relative to a location 118, 120, 122, position, and orientation of the AR device 106 within the three-dimensional region.

An eighth example provides the AR device 106 of the first embodiment, wherein the operations further comprises:
publishing the AR content to a second AR device based on a parameter matching, the second device configured to trigger a display of the media content displayed at a spatial location 118, 120, 122 corresponding to a physical object 102, 114, 116 in response to a determination of matching parameters.

A ninth example provides the AR device 106 of the eighth embodiment, wherein the second device is configured to adjust the spatial location 118, 120, 122 associated with the media content.

A tenth example provides the AR device 106 of the first embodiment, wherein the media content includes at least one of video data, audio data, image data, graphic data, and three-dimensional model data.

What is claimed is:

1. An augmented reality (AR) device comprising:
one or more hardware processors; and
a memory storing instructions that, when executed by the one or more hardware processors, configure the AR device to perform operations comprising:
receiving an AR authoring template from a remote server, the AR authoring template being associated with a first defined region and comprising a first entry corresponding to a first physical object located in the first defined region;
recording a video of a user physically manipulating the first physical object and demonstrating instructions for operating the first physical object, yielding a first media content item;
capturing a first set of spatial coordinates defining a first geographic location, the first geographic location indicating a location of the AR device while the AR device is recording the video of the user physically manipulating the first physical object and demonstrating instructions for operating the first physical object;
placing the first media content item and the first set of spatial coordinates in the first entry of the AR authoring template; and
generating AR content for the first defined region based on the AR authoring template, the AR content including a first trigger condition based on the first entry of the AR authoring template, the first trigger condition causing a second AR device executing the AR content to cause playback of the first media content item on a display of the second AR device in response to the second AR device determining that the second AR device is within a predetermined geographic distance of the first geographic location defined by the first set of special coordinates.

2. The AR device of claim 1, wherein the AR authoring template includes a second entry corresponding to a second physical object located in the first defined region.

3. The AR device of claim 2, the operations further comprising:
recording a video of the user physically manipulating the second physical object and demonstrating instructions for operating the second physical object, yielding a second media content item;
capturing a second set of spatial coordinates defining a second geographic location, the second geographic location indicating a location of the AR device while the AR device is recording the video of the user physically manipulating the second physical object and demonstrating instructions for operating the second physical object;
placing the second media content item and the second set of spatial coordinates in the second entry of the AR authoring template.

4. The AR device of claim 3, wherein generating the AR content for the first defined region is further based on second entry of AR authoring template.

5. The AR device of claim 4, wherein the AR content includes a second trigger condition based on the second entry of the AR authoring template, the second trigger condition causing the second AR device executing the AR content to cause playback of the second media content item on the display of the second AR device in response to the second AR device determining that the second AR device is within a predetermined geographic distance of the second geographic location defined by the second set of special coordinates.

6. The AR device of claim 1, the operations further comprising:
transmitting the AR content to the remote server, the remote server providing the AR content to at least the second AR device.

7. The AR device of claim 1, wherein the first set of spatial coordinates are defined relative to a position and orientation of the AR device within the first defined region.

8. A method comprising:
receiving, by an augmented reality (AR) device, an AR authoring template from a remote server, the AR authoring template being associated with a first defined region and comprising a first entry corresponding to a first physical object located in the first defined region;
recording a video of a user physically manipulating the first physical object and demonstrating instructions for operating the first physical object, yielding a first media content item;
capturing a first set of spatial coordinates defining a first geographic location, the first geographic location indicating a location of the AR device while the AR device is recording the video of the user physically manipulating the first physical object and demonstrating instructions for operating the first physical object;
placing the first media content item and the first set of spatial coordinates in the first entry of the AR authoring template; and
generating AR content for the first defined region based on the AR authoring template, the AR content including a first trigger condition based on the first entry of the AR authoring template, the first trigger condition causing a second AR device executing the AR content to cause playback of the first media content item on a display of the second AR device in response to the second AR device determining that the second AR device is within a predetermined geographic distance of the first geographic location defined by the first set of special coordinates.

9. The method of claim 8, wherein the AR authoring template includes a second entry corresponding to a second physical object located in the first defined region.

10. The method of claim 9, further comprising:
recording a video of the user physically manipulating the second physical object and demonstrating instructions for operating the second physical object, yielding a second media content item;
capturing a second set of spatial coordinates defining a second geographic location, the second geographic location indicating a location of the AR device while the AR device is recording the video of the user physically manipulating the second physical object and demonstrating instructions for operating the second physical object;
placing the second media content item and the second set of spatial coordinates in the second entry of the AR authoring template.

11. The method of claim 10, wherein generating the AR content for the first defined region is further based on second entry of AR authoring template.

12. The method of claim 11, wherein the AR content includes a second trigger condition based on the second entry of the AR authoring template, the second trigger condition causing the second AR device executing the AR content to cause playback of the second media content item on the display of the second AR device in response to the second AR device determining that the second AR device is within a predetermined geographic distance of the second geographic location defined by the second set of special coordinates.

13. The method of claim 8, further comprising:
transmitting the AR content to the remote server, the remote server providing the AR content to at least the second AR device.

14. The method of claim 8, wherein the first set of spatial coordinates are defined relative to a position and orientation of the AR device within the first defined region.

15. A non-transitory computer-readable medium storing instructions that, when executed by one or more computer processors of an augmented reality (AR) device, cause the AR device to perform operations comprising:
receiving an AR authoring template from a remote server, the AR authoring template being associated with a first defined region and comprising a first entry corresponding to a first physical object located in the first defined region;
recording a video of a user physically manipulating the first physical object and demonstrating instructions for operating the first physical object, yielding a first media content item;
capturing a first set of spatial coordinates defining a first geographic location, the first geographic location indicating a location of the AR device while the AR device is recording the video of the user physically manipulating the first physical object and demonstrating instructions for operating the first physical object;
placing the first media content item and the first set of spatial coordinates in the first entry of the AR authoring template; and
generating AR content for the first defined region based on the AR authoring template, the AR content including a first trigger condition based on the first entry of the AR authoring template, the first trigger condition causing a second AR device executing the AR content to cause playback of the first media content item on a display of the second AR device in response to the second AR device determining that the second AR device is within a predetermined geographic distance of the first geographic location defined by the first set of special coordinates.

16. The non-transitory computer-readable medium of claim 15, wherein the AR authoring template includes a second entry corresponding to a second physical object located in the first defined region.

17. The non-transitory computer-readable medium of claim 16, the operations further comprising:
recording a video of the user physically manipulating the second physical object and demonstrating instructions for operating the second physical object, yielding a second media content item;

capturing a second set of spatial coordinates defining a second geographic location, the second geographic location indicating a location of the AR device while the AR device is recording the video of the user physically manipulating the second physical object and demonstrating instructions for operating the second physical object;

placing the second media content item and the second set of spatial coordinates in the second entry of the AR authoring template.

18. The non-transitory computer-readable medium of claim 17, wherein generating the AR content for the first defined region is further based on second entry of AR authoring template.

19. The non-transitory computer-readable medium of claim 18, wherein the AR content includes a second trigger condition based on the second entry of the AR authoring template, the second trigger condition causing the second AR device executing the AR content to cause playback of the second media content item on the display of the second AR device in response to the second AR device determining that the second AR device is within a predetermined geographic distance of the second geographic location defined by the second set of special coordinates.

20. The non-transitory computer-readable medium of claim 16, the operations further comprising:

transmitting the AR content to the remote server, the remote server providing the AR content to at least the second AR device.

\* \* \* \* \*